US011462962B2

(12) United States Patent
Koike et al.

(10) Patent No.: US 11,462,962 B2
(45) Date of Patent: Oct. 4, 2022

(54) ROTOR FOR DYNAMO-ELECTRIC MACHINE, AND DYNAMO-ELECTRIC MACHINE

(71) Applicant: Nissan Motor Co., Ltd., Kanagawa (JP)

(72) Inventors: Yasuhisa Koike, Kanagawa (JP); Ryouichi Mizokami, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 140 days.

(21) Appl. No.: 16/966,695

(22) PCT Filed: Feb. 1, 2018

(86) PCT No.: PCT/JP2018/003428
§ 371 (c)(1),
(2) Date: Jul. 31, 2020

(87) PCT Pub. No.: WO2019/150527
PCT Pub. Date: Aug. 8, 2019

(65) Prior Publication Data
US 2021/0036564 A1 Feb. 4, 2021

(51) Int. Cl.
*H02K 1/30* (2006.01)
*H02K 1/27* (2022.01)
(Continued)

(52) U.S. Cl.
CPC .............. *H02K 1/30* (2013.01); *H02K 1/276* (2013.01); *H02K 21/14* (2013.01)

(58) Field of Classification Search
CPC .......... H02K 1/276; H02K 1/30; H02K 21/14; H02K 1/28; H02K 7/003
(Continued)

(56) References Cited

U.S. PATENT DOCUMENTS

| 4,720,649 A | 1/1988 | Habermann et al. |
| 4,987,330 A | 1/1991 | Murphy et al. |

(Continued)

FOREIGN PATENT DOCUMENTS

| EP | 3229345 A1 * 10/2017 | ............... H02K 1/22 |
| JP | 2004032943 A | 1/2004 |

(Continued)

OTHER PUBLICATIONS

International Search Report issued in International Application No. PCT/JP2018/003428, dated Apr. 24, 2018 (5 pages).
(Continued)

*Primary Examiner* — Alex W Mok
(74) *Attorney, Agent, or Firm* — Osha Bergman Watanabe & Burton LLP

(57) ABSTRACT

A rotor for a dynamo-electric machine includes a shaft and a rotor core constituted by laminating a plurality of electromagnetic steel sheets, and the rotor core is configured such that the shaft is attached to an inner periphery of the rotor core. Each of the electromagnetic steel sheets constituting the rotor core includes an insertion hole into which the shaft is inserted, and a key protruding radially inwardly from the insertion hole, the shaft includes a keyway formed along an axial direction, the shaft is attached by clearance fit to the insertion holes of the electromagnetic steel sheets, and the key is fitted by pressing into the keyway such that a side face of the key abuts on a side face of the keyway.

10 Claims, 11 Drawing Sheets

(51) Int. Cl.
*H02K 21/14* (2006.01)
*H02K 1/276* (2022.01)

(58) Field of Classification Search
USPC .................................................. 310/156.09
See application file for complete search history.

(56) References Cited

U.S. PATENT DOCUMENTS

| | | |
|---|---|---|
| 2013/0029057 A1 | 1/2013 | Laksin et al. |
| 2013/0076163 A1 | 3/2013 | Yu |
| 2013/0293057 A1 | 11/2013 | Naito et al. |
| 2017/0279323 A1 | 9/2017 | Kinoto et al. |

FOREIGN PATENT DOCUMENTS

| | | |
|---|---|---|
| JP | 2005168128 A | 6/2005 |
| JP | 2007181270 A | 7/2007 |
| JP | 2009060733 A | 3/2009 |
| JP | 2012100364 A | 5/2012 |
| JP | 2013074791 A | 4/2013 |
| JP | 2016123240 A | 7/2016 |
| WO | 2016088213 A1 | 6/2016 |

OTHER PUBLICATIONS

Written Opinion issued in International Application No. PCT/JP2018/003428; Dated Apr. 24, 2018 (5 pages).
Extended European Search Report issued in European Application No. 18903091.9, dated Dec. 18, 2020 (9 pages).

\* cited by examiner

ROTOR FOR DYNAMO-ELECTRIC MACHINE, AND DYNAMO-ELECTRIC MACHINE

TECHNICAL FIELD

The present invention relates to a rotor for a dynamo-electric machine and a dynamo-electric machine.

BACKGROUND ART

There has been conventionally known a rotor for a dynamo-electric machine, the rotor including a shaft and a rotor core formed by laminating a plurality of electromagnetic steel sheets. In terms of a fastening structure for the rotor core and the shaft, JP 2007-181270 A discloses a rotor for a dynamo-electric machine in which a shaft and a rotor core are fastened to each other such that a key provided on an inner peripheral side of each of electromagnetic steel sheets forming the rotor core is accommodated in a keyway formed on an outer peripheral surface of the shaft.

In the rotor for the dynamo-electric machine, a pin hole into which a pin is to be inserted is provided near the key of each of the electromagnetic steel sheets, and a cut portion extending from the pin hole to the key is provided. Hereby, when the pin is fitted by pressing into the pin hole, a distal end of the key of the electromagnetic steel sheet is opened, and the key is pressed against the keyway provided in the shaft, so that the shaft and the rotor core are fastened to each other.

SUMMARY OF INVENTION

In the rotor for the dynamo-electric machine, the pin hole is provided in each of the electromagnetic steel sheets, and therefore, durability strength of the rotor against a centrifugal force generated at the time when the rotor rotates might decrease. Further, due to the configuration in which the distal end of the key of the electromagnetic steel sheet is opened by pressing the pin into the pin hole, there is such a concern that a strain generated when the rotor core and the shaft are fastened is transmitted so that an unnecessary stress is applied to the rotor core, thereby causing an adverse effect on rotor strength.

An object of the present invention is to provide a rotor for a dynamo-electric machine in which a shaft and a rotor core can be fastened while an adverse effect on rotor strength is reduced.

According to an aspect of this invention, there is provided a rotor for a dynamo-electric machine that includes a shaft and a rotor core constituted by laminating a plurality of electromagnetic steel sheets, and the rotor core is configured such that the shaft is attached to an inner periphery of the rotor core. Each of the electromagnetic steel sheets constituting the rotor core includes an insertion hole into which the shaft is inserted, and a key protruding radially inwardly from the insertion hole, the shaft includes a keyway formed along an axial direction, the shaft is attached by clearance fit to the insertion holes of the electromagnetic steel sheets, and the key is fitted by pressing into the keyway such that a side face of the key abuts on a side face of the keyway.

DESCRIPTION OF EMBODIMENTS

With reference to the drawings and so on, the following describes embodiments of the present invention.

First Embodiment

Figure 1:
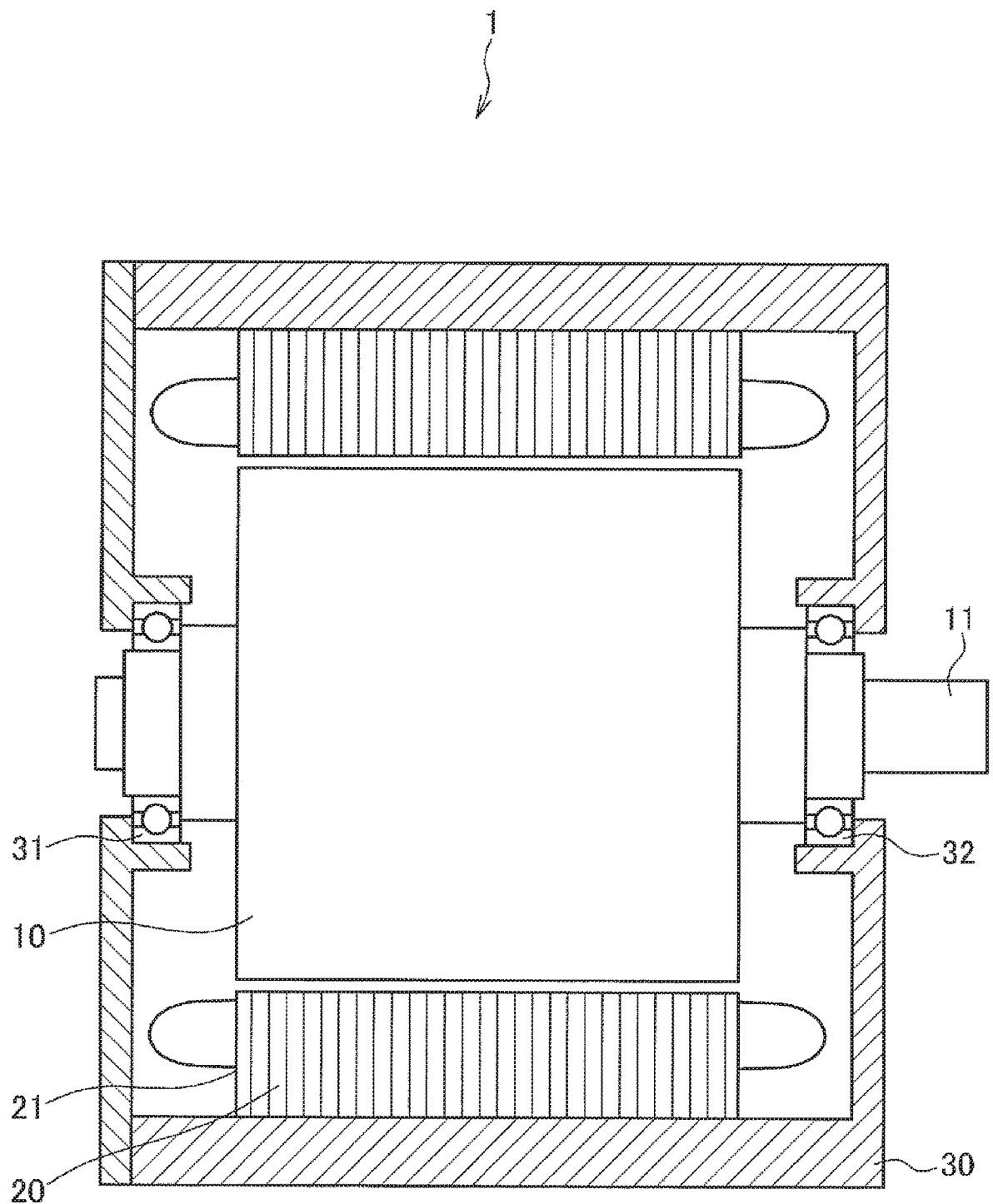
FIG. 1 is a schematic configuration diagram illustrating a motor using a rotor according to a first embodiment.

FIG. 1 is a schematic configuration diagram illustrating a motor 1 using a rotor 10 according to a first embodiment. The motor 1 illustrated in FIG. 1 rotates upon receipt of supply of electric power from a power supply such as a battery and functions as an electric motor for driving wheels of a vehicle. Further, the motor 1 also functions as a generator driven by external force to generate electric power. Accordingly, the motor 1 is configured as a so-called dynamo-electric machine motor generator) functioning as an electric motor and a generator.

As illustrated in FIG. 1, the motor 1 includes the rotor 10, a stator 20 placed on an outer peripheral side of the rotor 10, and a case 30 in which the rotor 10 and the stator 20 are accommodated.

The rotor 10 is placed inside the stator 20 so as to be rotatable relative to the stator 20. The rotor 10 includes a shaft 11 as a rotating shaft. The shaft 11 is rotatably supported by bearings 31, 32 provided in the case 30.

The stator 20 is a cylindrical member formed such that a plurality of electromagnetic steel sheets 21 is laminated. Coils of a U-phase, a V-phase, and a W-phase are wound around teeth of the stator 20.

The case 30 is a housing configured as a cylindrical member in which the rotor 10 and the stator 20 can be accommodated. An inner peripheral surface of the case 30 is formed as a flat mounting surface on which the stator 20 is provided.

Figure 2:
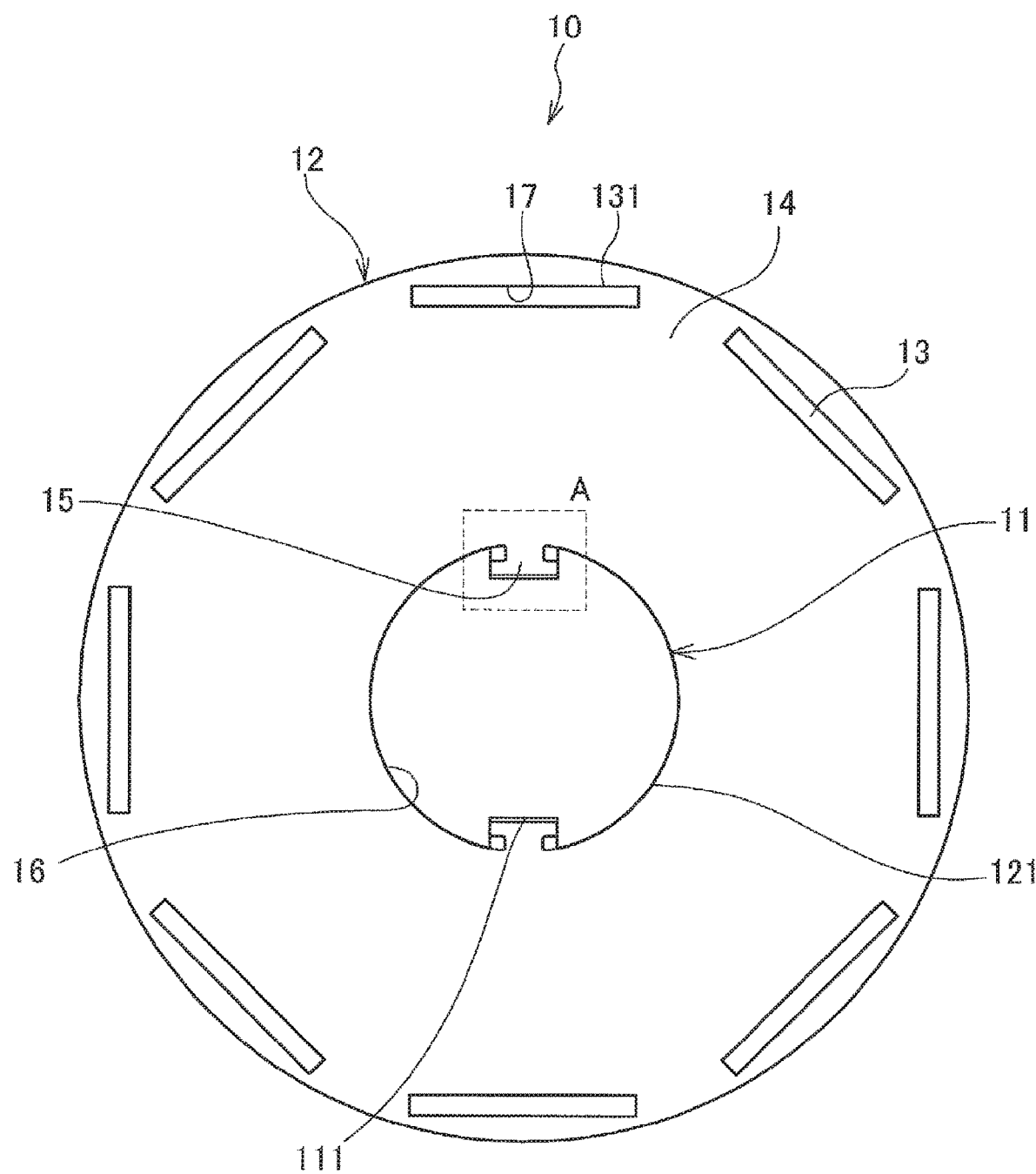
FIG. 2 is a schematic configuration diagram of the rotor according to the first embodiment.

FIG. 2 is a schematic configuration diagram of the rotor 10 viewed from the axial direction of the shaft 11. The rotor 10 includes the shaft 11, a rotor core 12, and magnets 13. The rotor core 12 is formed such that a plurality of electromagnetic steel sheets 14 is laminated in the axial direction of the shaft 11. The rotor core 12 includes a shaft insertion hole 121 that is a cylindrical hole formed in the center of the rotor core 12, and a plurality of (e.g., eight) magnet storage holes 131 provided at regular intervals along the circumferential direction at a position closer to an outer periphery of the rotor core 12. The magnets 13 are inserted into the magnet storage holes 131.

The shaft 11 is inserted into the shaft insertion hole 121 of the rotor core 12 and transmits power caused by rotational motion of the rotor 10. Keyways 111 that are recessed grooves formed along the axial direction are formed on an outer peripheral surface of the shaft 11. Two keyways 111 are formed at regular intervals in the circumferential direction of the shaft 11. A key 15 (described later) of the electromagnetic steel sheet 14 is fitted by pressing into the keyway 111.

The electromagnetic steel sheet 14 constituting the rotor core 12 has a toric shape and includes an insertion hole 16, holes 17 for magnet storage, and keys 15. The insertion hole 16 is a circular hole formed in the center of the electromagnetic steel sheet 14, and when the electromagnetic steel sheets 14 are laminated so that the insertion holes 16 are put on top of each other, the shaft insertion hole 121 of the rotor core 12 is formed. The holes 17 for magnet storage are provided at regular intervals along the circumferential direction at a position close to the outer periphery of the rotor core 12. The holes 17 form the magnet storage holes 131 of the rotor core such that the electromagnetic steel sheets 14 are laminated so that the holes 17 are put on top of each other.

The key 15 is a part protruding radially inwardly from the insertion hole 16. Two keys 15 are formed at regular intervals in the circumferential direction of the electromagnetic steel sheet 14, and in a state where the electromagnetic steel sheets 14 are laminated, the keys 15 are fitted by pressing into the keyways 111 of the shaft 11. The rotor core 12 and the shaft 11 are fastened to each other by the shaft 11 is inserted into the shaft insertion hole 121 and the keys 15 are fitted by pressing into the keyways 111. Details of the fastening structure for the rotor core 12 and the shaft 11 will be described later. Note that, in the present embodiment, the keys 15 of the electromagnetic steel sheet 14 are formed at two parts, but the number of keys 15 is not limited to this. The number of parts where the key 15 is formed may be one or may be equal to or more than three. The number and arrangement of the keyways 111 in the shaft 11 are set to correspond to the number and arrangement of the keys 15 in the electromagnetic steel sheet 14.

Figure 3:
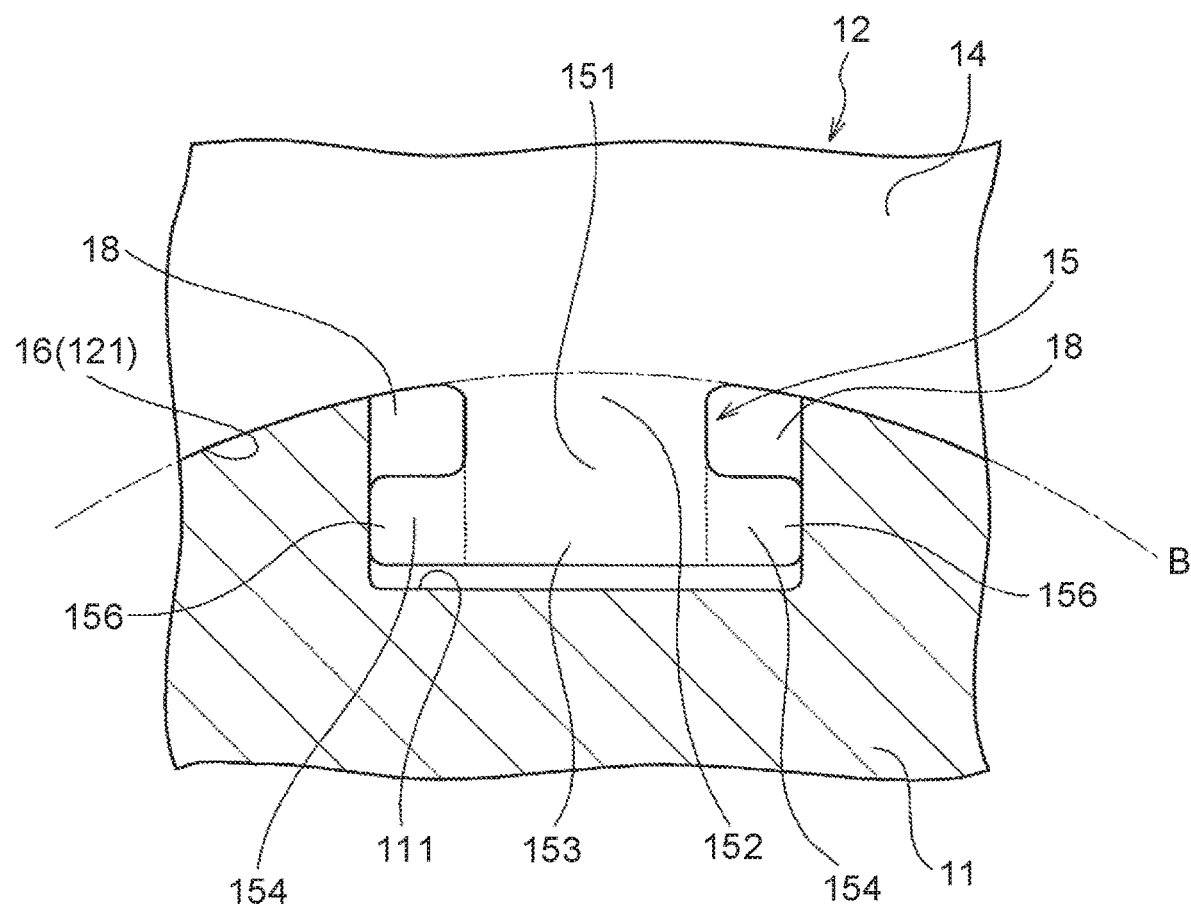
FIG. 3 is a partial enlarged view of an electromagnetic steel sheet and illustrates a region A in FIG. 2 in an enlarged manner.
Figure 4:
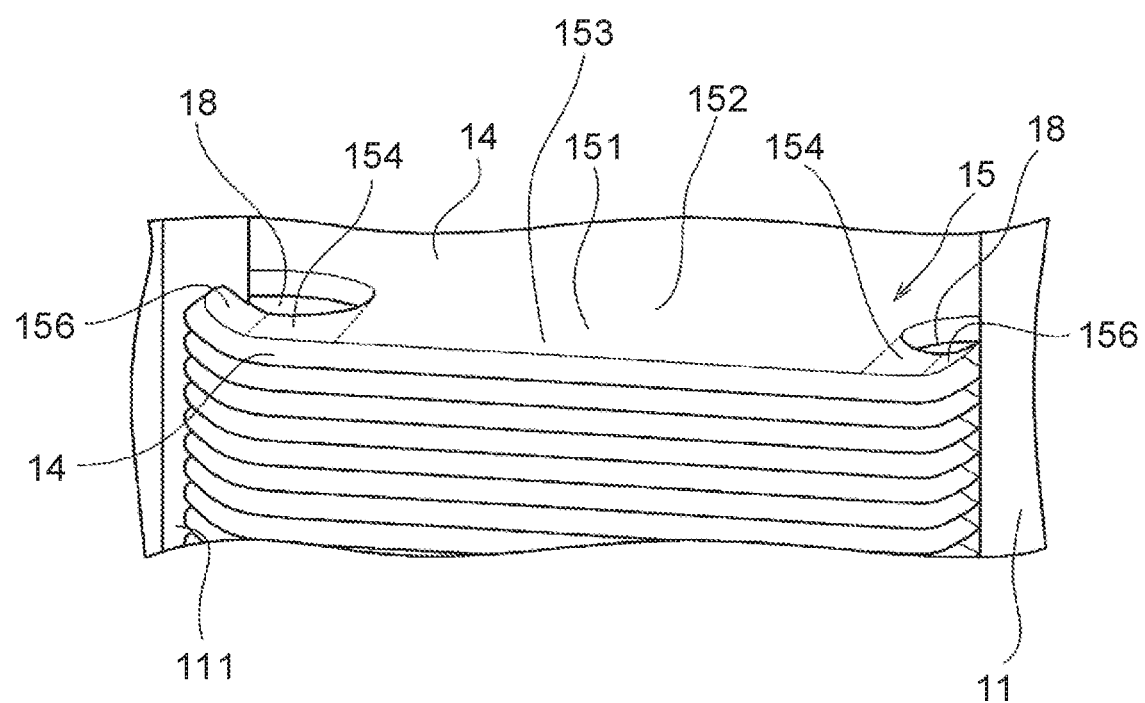
FIG. 4 is a view illustrating a fastening part between a rotor core and a shaft in an enlarged manner.

FIG. 3 is a partial enlarged view of the electromagnetic steel sheet and illustrates a region A in FIG. 2 in an enlarged manner, and FIG. 4 is a view illustrating a fastening part between the rotor core 12 and the shaft 11 in an enlarged manner. The electromagnetic steel sheet 14 in the present embodiment is a thin sheet having a thickness of around 0.2 to 0.5 mm, however the thickness of the electromagnetic steel sheet 14 is not limited to this range. As illustrated in FIG. 3, the key 15 protruding radially inwardly from the insertion hole 16 of the electromagnetic steel sheet 14 includes an extension portion 151 protruding radially inwardly from the insertion hole 16, and projection portions 154 protruding outwardly (on side faces) in the width direction of the extension portion 151 from opposite side faces of the extension portion 151 in the width direction (the circumferential direction).

The shaft 11 is inserted by clearance fit into the shaft insertion hole 121 of the rotor core 12, the shaft insertion hole 121 being formed such that the insertion holes 16 of the electromagnetic steel sheets 14 are put on top of each other. The clearance fit is such that a slight gap is formed between the outer peripheral surface of the shaft 11 and an inner peripheral surface of the rotor core 12. Further, when the two projection portions 154 of the key 15 abut on opposite side faces of the keyway 111 of the shaft 11, respectively, the key 15 is fitted by pressing into the keyway 111, so that the shaft 11 and the rotor core 12 are fastened to each other. Since each electromagnetic steel sheet 14 is made of a thin plate, the electromagnetic steel sheet 14 easily deforms plastically, and at the time of press-fitting, distal ends 156 of the projection portions 154 of the key 15 abut on the side faces of the keyway 111 in a state where the distal ends 156 deform in the axial direction as illustrated in FIG. 4.

In a case where a whole inner periphery of the rotor core 12 is fitted by pressing into a whole outer periphery of the shaft 11, a strain generated in the press-fitting is transmitted so that a stress is applied to an outer peripheral surface of the rotor core 12 in which the magnets 13 are stored. This adversely affects the strength of the rotor 10. In the meantime, in the present embodiment, the rotor core 12 and the shaft 11 are fastened to each other by fitting, by pressing, only key-15 parts of the electromagnetic steel sheet 14 into the keyways 111 of the shaft 11, and the shaft 11 is inserted by clearance fit in other parts of the insertion hole 16 of the electromagnetic steel sheet 14. Hereby, an unnecessary stress is not applied to an outer peripheral end surface of the rotor core 12, thereby making it possible to reduce the adverse effect on the strength of the rotor 10.

Further, as described above, when each of the electromagnetic steel sheets 14 is fitted by pressing, the distal ends 156 of the projection portions 154, the distal ends 156 abutting on the keyway 111, deform in the axial direction. Due to the deformation, it is possible to restrain a press-fitting stress from becoming too high. Further, a compressive stress applied to the key 15 at the time of press-fitting concentrates on the projection portion 154, and a strain caused by the compressive stress is hardly transmitted to a root 152 of the extension portion 151 of the key 15.

As illustrated in FIG. 3, in a state where the key 15 is fitted by pressing into the keyway 111, a recessed portion 18 surrounded by the side face of the keyway 111 and the rotor core 12 is formed on an outer peripheral side of the projection portion 154. The recessed portion 18 is placed inwardly (on a central side of the shaft 11) from an inside diameter line B of the rotor core 12. In a case where the recessed portion 18 projects outwardly (on an outside diameter side) from the inside diameter line of the rotor core 12, an adverse effect on the strength of the rotor core 12 against a centrifugal force might be caused. In the meantime, in the present embodiment, since the recessed portion 18 is placed inwardly from the inside diameter line of the rotor core 12, it is possible to restrain the adverse effect on the strength of the rotor core 12.

Further, as illustrated in FIG. 3, a radial distal end 153 of the extension portion 151 has a slight gap from the keyway 111 and does not abut on the keyway 111. Hereby, in comparison with a case where the radial distal end 153 of the extension portion 151 abuts on the keyway 111, an unnecessary stress is not applied to the rotor core 12.

Next will be described a tensile stress to be applied to the key 15 with reference to FIGS. 5, 6A, and 6B.

Figure 5:
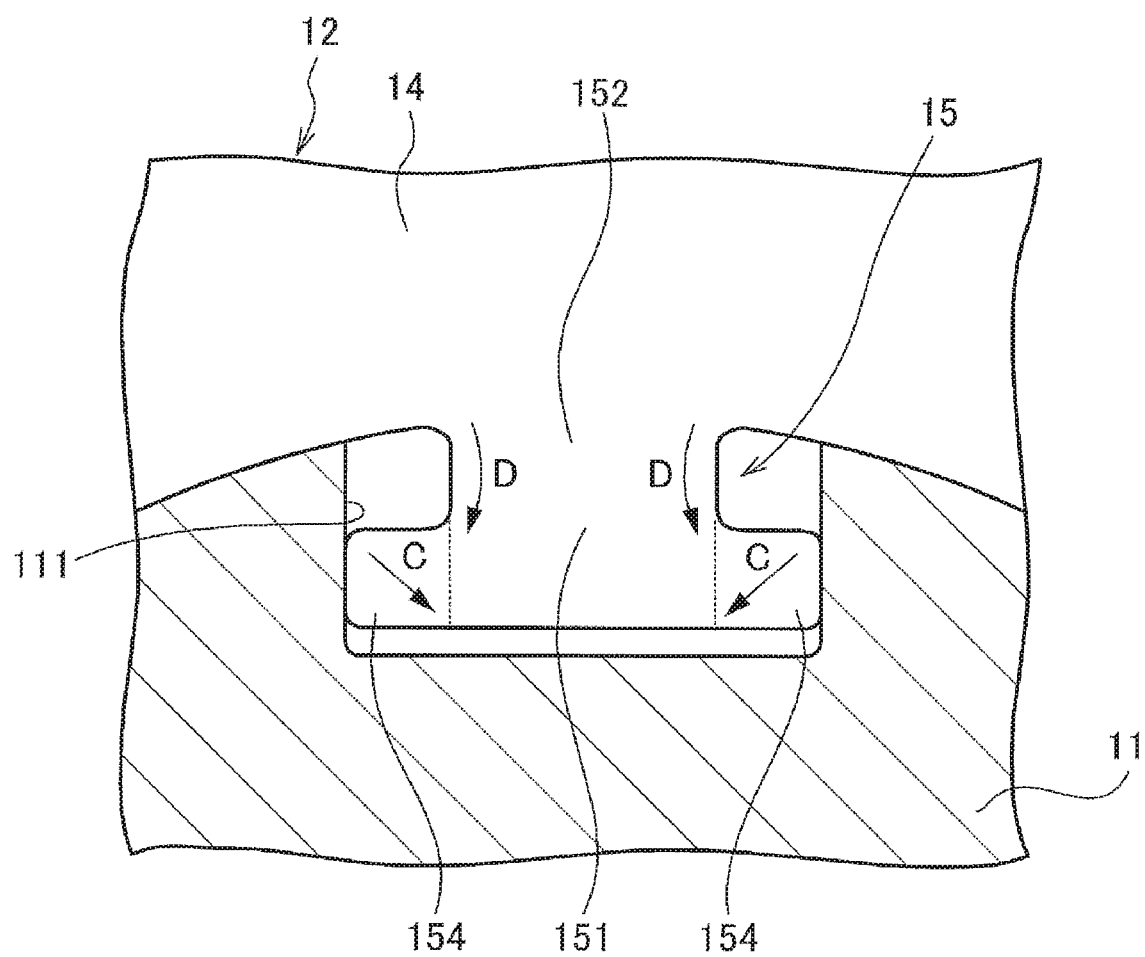
FIG. 5 is a partial enlarged view of the electromagnetic steel sheet.

FIG. 5 is a view illustrating a compressive stress and a tensile stress applied to the key 15 when the key 15 of the electromagnetic steel sheet 14 is fitted by pressing into the keyway 111 of the shaft 11. When the key 15 is fitted by pressing into the keyway 111, a compressive stress to act on the projection portion 154 from the side face of the key-way 111 is diagonally applied in an inside-diameter direction (a direction indicated by an arrow C in FIG. 5) of the rotor 10. Due to the action of the compressive stress, a tensile stress in an inside-diameter direction a direction indicated by an arrow D in FIG. 5) of the rotor core 12 is applied to the vicinity of the root 152 of the extension portion 151 of the key 15.

Figure 6A:
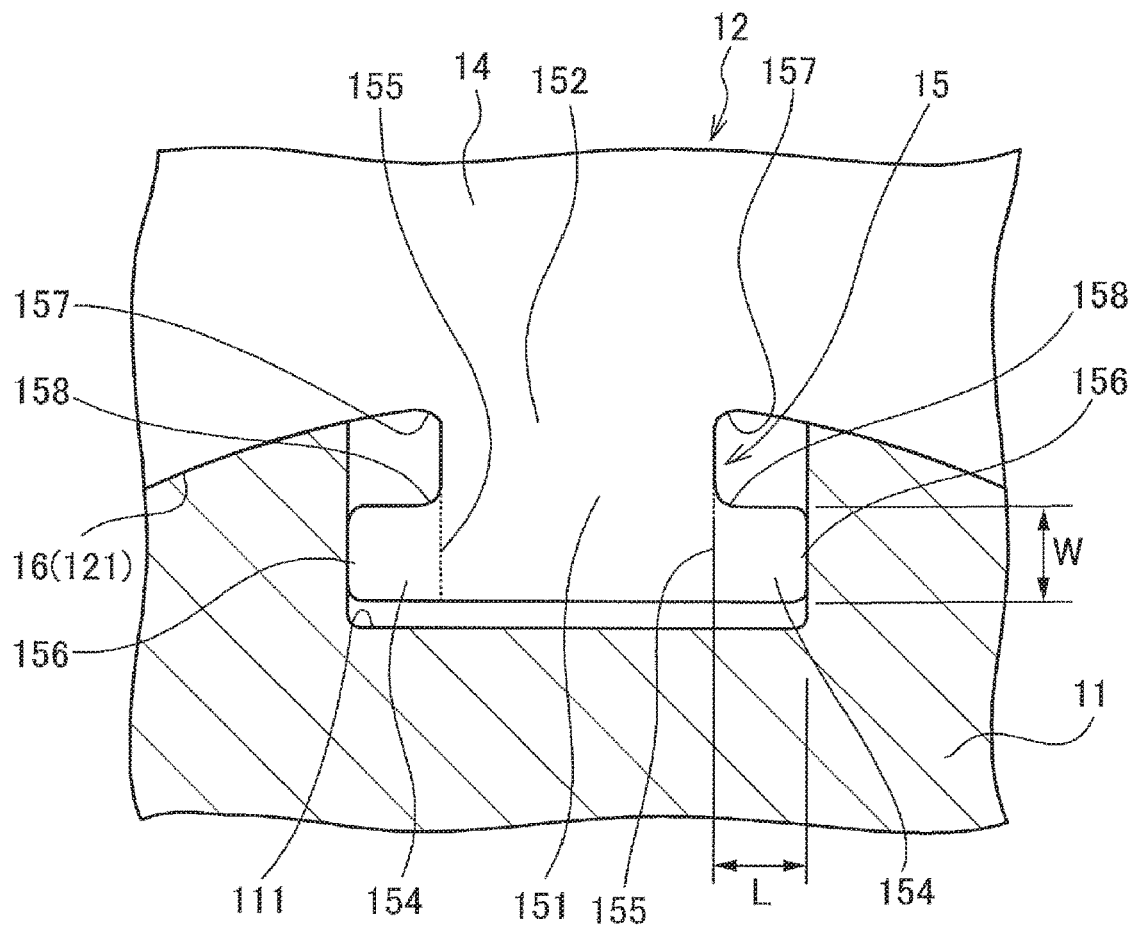
FIG. 6A is a partial enlarged view of the electromagnetic steel sheet.
Figure 6B:
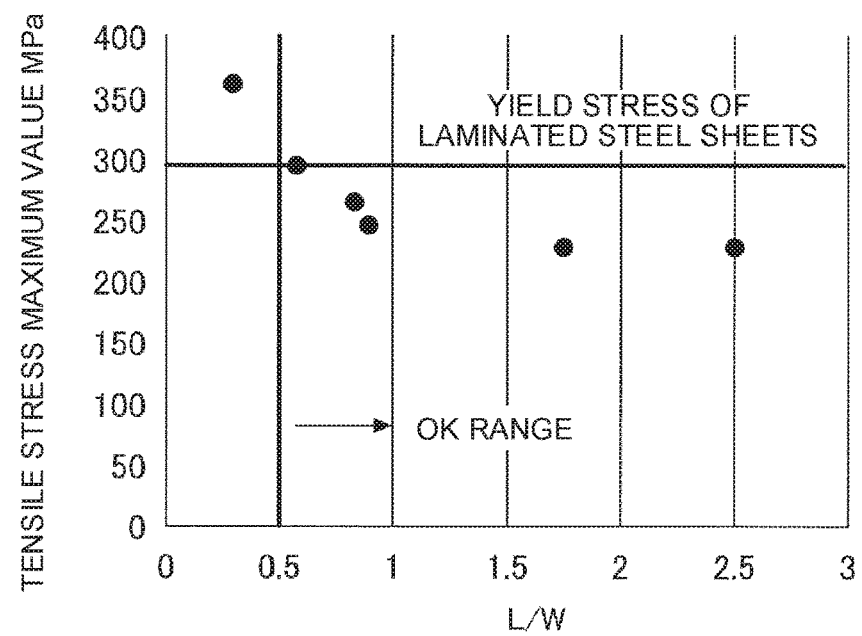
FIG. 6B is a view illustrating a relationship between a maximum value of a tensile stress and a dimension of a projection portion constituting a key of the electromagnetic steel sheet.

As illustrated in FIG. 6A, in a case where a length from a root 155 to a distal end 156 in the projection portion 154 of the key 15 is taken as L, and a width dimension of the projection portion 154 is taken as W, when L/W is set to a given value, it is possible to adjust the tensile stress to act on the key 15. FIG. 6B is a view illustrating a result obtained by analyzing a maximum value (MPa) of the tensile stress applied to the root 152 of the key 15 by changing L/W. As illustrated in FIG. 6B, the tensile stress and L/W have a generally inversely proportional relationship until the value of L/W is around 1.0.

In the present embodiment, the electromagnetic steel sheet 14 having a thickness of around 0.2 to 0.5 mm and a yield stress of 300 MPa is used. As illustrated in FIG. 6B, in order that the tensile stress to be applied to the root 152 of the key 15 is equal to or less than 300 MPa that is the yield stress of the electromagnetic steel sheet 14 of the present embodiment, L/W should be equal to or more than 0.5. This makes it possible to prevent the tensile stress to be applied to the root 152 of the key 15 from exceeding the yield stress of the electromagnetic steel sheet 14. As such, it is preferable to design the value of L/W to be equal to or more than 0.5.

Note that, as illustrated in FIG. 6A, an internal corner 157 at a position where the extension portion 151 is connected to the insertion hole 16 and an internal corner 158 at a position where the extension portion 151 is connected to the projection portion 154 are formed in a curved shape. Hereby, when the key 15 is fitted by pressing into the keyway 111, the tensile stress applied to the key 15 is dispersed by a curved portion having a curved shape. Accordingly, it is possible to more effectively reduce the tensile stress applied to the root 152 of the key 15 in the inside-diameter direction of the rotor core 12.

The rotor 10 of the motor 1 of the first embodiment can yield the following effects.

In the rotor 10 of the motor 1, the rotor core 12 and the shaft 11 are fastened to each other by performing press-fitting such that the side face of the key 15 of the electromagnetic steel sheet 14 abuts on the side face of the keyway 111 of the shaft 11, and the shaft 11 is inserted by clearance fit in other parts of the insertion hole 16 of the electromagnetic steel sheet 14. On this account, in comparison with a case where the whole inner periphery of the rotor core 12 is fitted by pressing into the whole outer periphery of the shaft 11, an unnecessary stress is not applied to the rotor core 12, thereby making it possible to reduce an adverse effect on the strength of the rotor 10.

Further, in the rotor 10 of the motor 1, the rotor core 12 and the shaft 11 are fastened to each other by fitting, by pressing, the key-15 part of the electromagnetic steel sheet 14 into the keyway 111 of the shaft 11, and therefore, unlike JP 2007-181270 A, it is not necessary to provide a pin hole in the rotor core 12 and to insert a pin therein. On this account, it is possible to prevent such a situation that a strain generated by opening the distal end of the key of the electromagnetic steel sheet by insertion of the pin is transmitted and an unnecessary stress is applied to the rotor core, and it is possible to prevent the pin hole from decreasing the durability strength of the rotor 10 against a centrifugal force generated at the time when the rotor rotates. Further, the rotor 10 of the motor 1 does not require provision of a pin hole in the rotor core 12 and insertion of a pin into the rotor core 12, and therefore, it is possible to simplify assembly of the rotor 10 and to achieve a reduction in cost.

In the rotor 10, two projection portions 154 protruding outwardly (on the side faces in the width direction in the extension portion 151 of the key 15 provided in the electromagnetic steel sheet 14 constituting the rotor core 12 abut on the opposite side faces of the keyway 111, respectively, and the key 15 is fitted by pressing into the keyway 111. In a case where press-fitting is performed in a state where the electromagnetic steel sheets 14 including the projection portions 154 are laminated as such, the distal ends 156 of the projection portions 154, the distal ends 156 abutting on the keyway 111, deform in the axial direction. The deformation relieves a press-fitting stress, thereby making it possible to restrain occurrence of contamination due to shaving of the shaft 11 when the shaft 11 rubs against the electromagnetic steel sheets 14.

Further, since the distal end 156 of the projection portion 154 is configured to be deformable in the axial direction, it is possible to set the width of the keyway 111 of the shaft 11 to be small, or it is possible to set the length L from the root 155 to the distal end 156 in the projection portion 154 to be long. Hereby, even if machining accuracy of the shaft 11 and the rotor core 12 decreases, it is possible to surely fasten the shaft 11 to the rotor 10.

Further, since the projection portion 154 protruding from the side face of the extension portion 151 of the key 15 is fitted by pressing, a compressive stress applied to the key 15 in the press-fitting concentrates on the projection portion 154. Accordingly, a strain caused by the compressive stress is hardly transmitted to the root 152 of the key 15. On this account, the root 152 of the key 15 should tolerate only a torque generated in the rotor core 12, and in comparison with a case where the projection portion 154 is not provided, it is possible to largely reduce a requested strength of the key 15. Further, since the strain caused by the compressive stress is not transmitted to an outside-diameter side relative to an inner peripheral surface of the electromagnetic steel sheet 14, it is possible to prevent an adverse effect on the strength of the rotor 10.

Further, even in a case where the projection portion 154 buckles during the press-fitting of the projection portion 154, traveling of the vehicle, or the like, the extension portion 151 of the key 15 makes contact with the shaft 11, so that rotational power of the rotor 10 can be transmitted to the shaft 11. This can maintain traveling of the vehicle.

In the electromagnetic steel sheet 14, the recessed portion 18 formed on the outer peripheral side of the projection portion 154 such that the recessed portion 18 is surrounded by the side face of the keyway 111 and the rotor core 12 is placed inwardly from the inside diameter line of the rotor core 12. Hereby, in comparison with a configuration in which the recessed portion 18 projects outwardly from the inside diameter line of the rotor core 12, an adverse effect on the strength of the rotor core 12 against a centrifugal force caused by rotation of the rotor 10 can be restrained.

Further, the electromagnetic steel sheet 14 is designed such that the value of L/W is equal to or more than 0.5 when L indicates the length from the root 155 to the distal end 156 in the projection portion 154 of the key 15, and W indicates the width dimension of the projection portion. This makes it possible to prevent the tensile stress to be applied to the root 155 of the key 15 from exceeding the yield stress of the electromagnetic steel sheet 14.

Further, in the electromagnetic steel sheet 14, the internal corner 158 at the position where the extension portion 151 of the key 15 is connected to the projection portion 154 and the internal corner 157 at the position where the extension portion 151 of the key 15 is connected to the insertion hole 16 are formed in a curved shape. Hereby, when the key 15 is fitted by pressing into the keyway 111, the tensile stress applied to the key 15 is dispersed by a curved portion having a curved shape. This accordingly makes it possible to reduce the tensile stress applied to the root 152 of the key 15 in the inside-diameter direction of the rotor core 12. Hereby, it is also possible to prevent the tensile stress to be applied to the root 152 of the key 15 from exceeding the yield stress of the electromagnetic steel sheet 14.

Further, the keys 15 in the electromagnetic steel sheet 14 are formed at regular intervals in the circumferential direction of the electromagnetic steel sheet 14, and the keyways 111, of the shaft 11, that correspond to the keys 15 are formed at regular intervals in the circumferential direction of the shaft 11. Hereby, in comparison with a case where the keys 15 and the keyways 111 are not placed at regular intervals, it is possible to restrain deformation of the rotor core 12 and occurrence of the tensile stress due to a centrifugal force, and it is possible to restrain the adverse effect on the strength of the rotor core 12.

Second Embodiment

Figure 7:
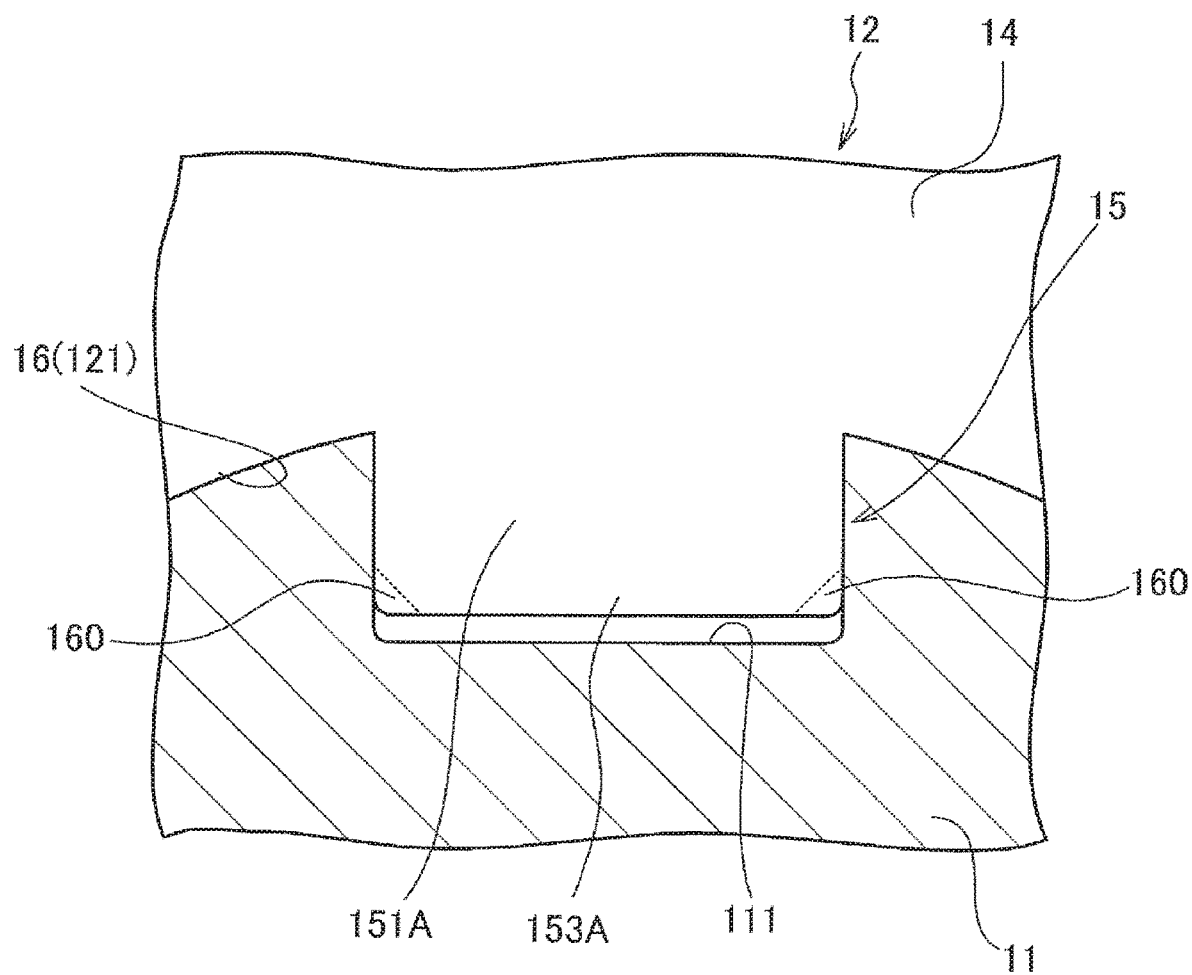
FIG. 7 is a partial enlarged view of an electromagnetic steel sheet according to a second embodiment.

With reference to FIG. 7, the rotor 10 of the motor 1 according to a second embodiment will be described.

FIG. 7 is a partial enlarged view of the electromagnetic steel sheet 14 according to the second embodiment and is a view illustrating a part corresponding to the part A in FIG. 2 in an enlarged manner. The second embodiment is different from the rotor 10 of the motor 1 in the first embodiment in that the key 15 of the electromagnetic steel sheet 14 does not include the projection portion 154. Note that, in the following embodiment, a constituent having the same function as a constituent in the first embodiment has the same reference sign as the constituent in the first embodiment, and descriptions are made by omitting redundant descriptions appropriately.

As illustrated in FIG. 7, the key 15 of the electromagnetic steel sheet 14 does not include the projection portion 154 and includes only an extension portion 151A. The shaft 11 is inserted by clearance fit into the shaft insertion hole 121 of the rotor core 12, the shaft insertion hole 121 being formed such that the insertion holes 16 of the electromagnetic steel sheets 14 are put on top of each other. Further, when opposite side faces of the extension portion 151A of the key 15 abut on the opposite side faces of the keyway 111 of the shaft 11, respectively, the key 15 is fitted by pressing into the keyway 111, so that the shaft 11 and the rotor core 12 are fastened to each other. Since each electromagnetic steel sheet 14 easily deforms plastically, external corners 160 where a distal end 153A of the extension portion 151A of the key 15 is connected to the side faces of the extension portion 151A abut on the side faces of the keyway 111 in a state where the external corners 160 deform in the axial direction.

The rotor 10 of the motor 1 of the second embodiment can yield the following effects.

In the rotor 10 of the motor 1, the rotor core 12 and the shaft 11 are fastened to each other by performing press-fitting such that the side faces of the key 15 of the electromagnetic steel sheet 14 abut on the side faces of the keyway 111 of the shaft 11, and the shaft 11 is inserted by clearance fit in other parts of the insertion hole 16 of the electromagnetic steel sheet 14. On this account, in comparison with a case where the whole inner periphery of the rotor core 12 is fitted by pressing into the whole outer periphery of the shaft 11, an unnecessary stress is not applied to the rotor core 12, thereby making it possible to reduce an adverse effect on the strength of the rotor 10.

In the rotor 10 of the motor 1, the rotor core 12 and the shaft 11 are fastened to each other by fitting, by pressing, the key 15 of the electromagnetic steel sheet 14 into the keyway 111 of the shaft 11, and therefore, unlike JP 2007-181270 A, it is not necessary to provide a pin hole in the rotor core 12 and to insert a pin therein. On this account, it is possible to prevent such a situation that a strain generated by opening the distal end of the key of the electromagnetic steel sheet due to insertion of the pin is transmitted and an unnecessary stress is applied to the rotor core, and it is possible to prevent the pin hole from decreasing the durability strength of the rotor 10 against a centrifugal force generated at the time when the rotor rotates. Further, the rotor 10 of the motor 1 does not require provision of a pin hole in the rotor core 12 and insertion of a pin into the rotor core 12. This can simplify assembly of the rotor 10 and achieve a reduction in cost.

In the rotor core 12, in a state where the electromagnetic steel sheets 14 are laminated, the keys 15 are fitted by pressing into the keyway 111 while the opposite side faces of the keys 15 provided in the electromagnetic steel sheets 14 are brought into contact with the opposite side faces of the keyway 111, respectively. In a case where press-fitting is performed in a state where the electromagnetic steel sheets 14 are laminated as such, the external corners 160 where the distal end 153A of the extension portion 151A of the key 15 is connected to the side faces of the extension portion 151A deform in the axial direction. Due to this deformation, a press-fitting stress is relieved, thereby making it possible to restrain occurrence of contamination due to shaving of the shaft 11 when the shaft 11 rubs against the electromagnetic steel sheets 14.

Further, since the external corners 160 where the distal end 153A of the extension portion 151A is connected to the side faces of the extension portion 151A are configured to be deformable in the axial direction, it is possible to set the width of the keyway 111 of the shaft 11 to be small or to set the width of the extension portion 151A to be large. Hereby, even if machining accuracy of the shaft 11 and the rotor core 12 decreases, it is possible to surely fasten the shaft 11 to the rotor 10.

Third Embodiment

Figure 8:
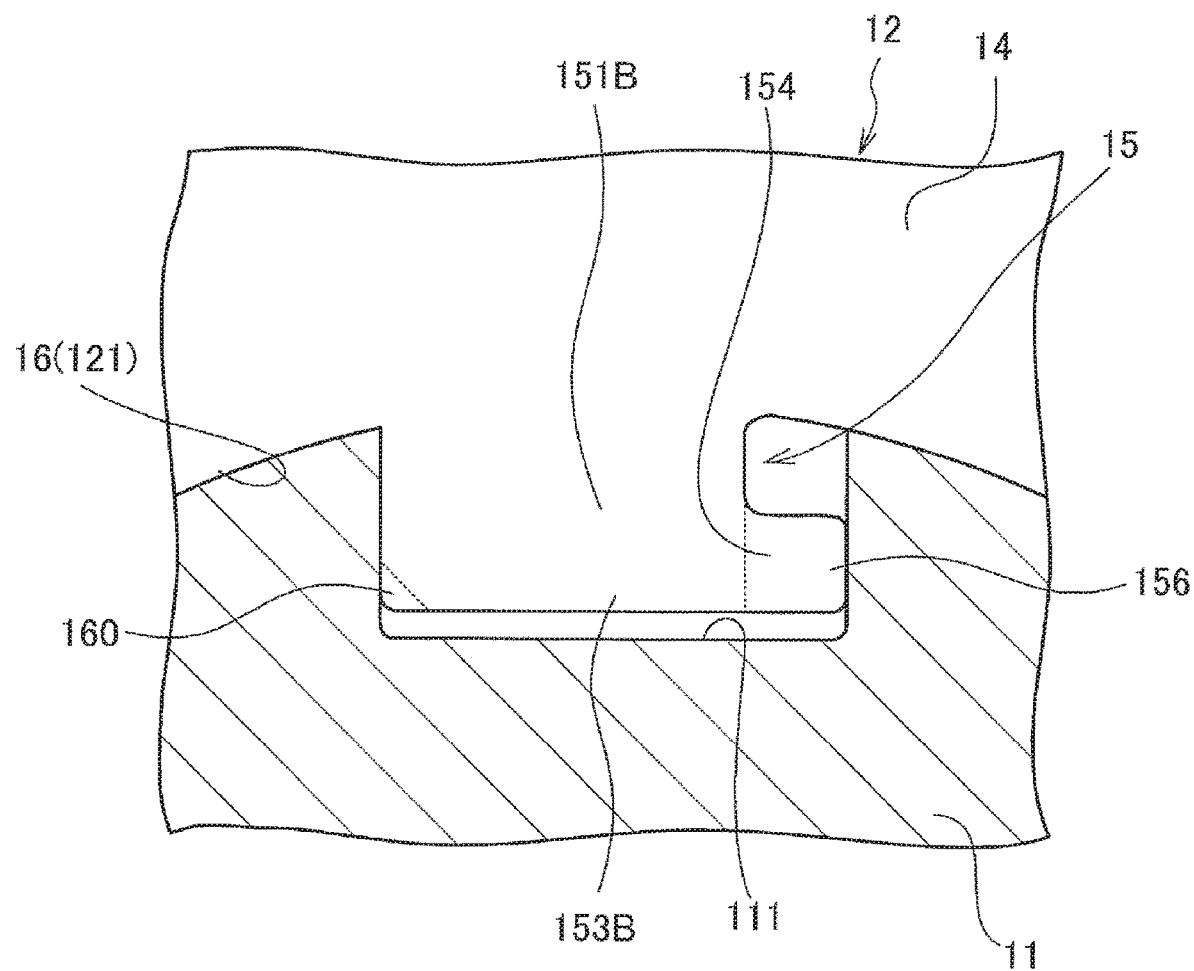
FIG. 8 is a partial enlarged view of an electromagnetic steel sheet according to a third embodiment.

With reference to FIG. 8, the rotor 10 of the motor 1 according to a third embodiment will be described.

FIG. 8 is a partial enlarged view of the electromagnetic steel sheet 14 according to the third embodiment and is a view illustrating a part corresponding to the part A in FIG. 2 in an enlarged manner. The third embodiment is different from the rotors 10 of the motors 1 in the first and second embodiments in that the key 15 of the electromagnetic steel sheet 14 includes the projection portion 154 only on one side face of an extension portion 151B.

As illustrated in FIG. 8, the key 15 of the electromagnetic steel sheet 14 includes the projection portion 154 protruding outwardly (on the side face) in the width direction of the extension portion 151B from one side face of the extension portion 151B in the width direction (the circumferential direction).

The shaft 11 is inserted by clearance fit into the shaft insertion hole 121 of the rotor core 12, the shaft insertion hole 121 being formed such that the insertion holes 16 of the electromagnetic steel sheets 14 are put on top of each other. Further, the key 15 is fitted by pressing into the keyway 111 such that the projection portion 154 of the key 15 abuts on a side face, on one side, of the keyway 111 of the shaft 11, and a side face of the extension portion 151B of the key 15 on a side where the projection portion 154 is not extended abuts on a side face, on the other side, of the keyway 111. Hereby, the shaft 11 and the rotor core 12 are fastened to each other. Since each electromagnetic steel sheet 14 easily deforms plastically, the distal end 156, of the projection portion 154, that abuts on the keyway 111 and the external corner 160 where a distal end 153B of the extension portion 151B of the key 15 is connected to the side face of the extension portion 151B abut on the side faces of the keyway 111 in a state where the distal end 156 and the external corner 160 deform in the axial direction.

In the rotor 10 of the motor 1 in the third embodiment, press-fitting is also performed such that the side faces of the key 15 abut on the side faces of the keyway 111, and the shaft 11 is inserted by clearance fit in other parts of the insertion hole 16 of the electromagnetic steel sheet 14. On this account, an unnecessary stress is not applied to the rotor core 12, thereby making it possible to reduce an adverse effect on the rotor 10. Further, at the time of press-fitting, in a state where the distal end 156 of the projection portion 154 of the key 15 and the external corner 160 where the distal end 153B of the extension portion 151B of the key 15 is connected to the side face of the extension portion 151B deform in the axial direction, the distal end 156 and the external corner 160 abut on the side faces of the keyway 111, so that a press-fitting stress is relieved. Further, since the projection portion 154 protruding from the side face of the extension portion 151B of the key 15 is fitted by pressing, a compressive stress applied to the key 15 in the press-fitting concentrates on the projection portion 154. Accordingly, the rotor 10 of the third embodiment can also yield effects similar to those in the first embodiment and the second embodiment.

Fourth Embodiment

Figure 9:
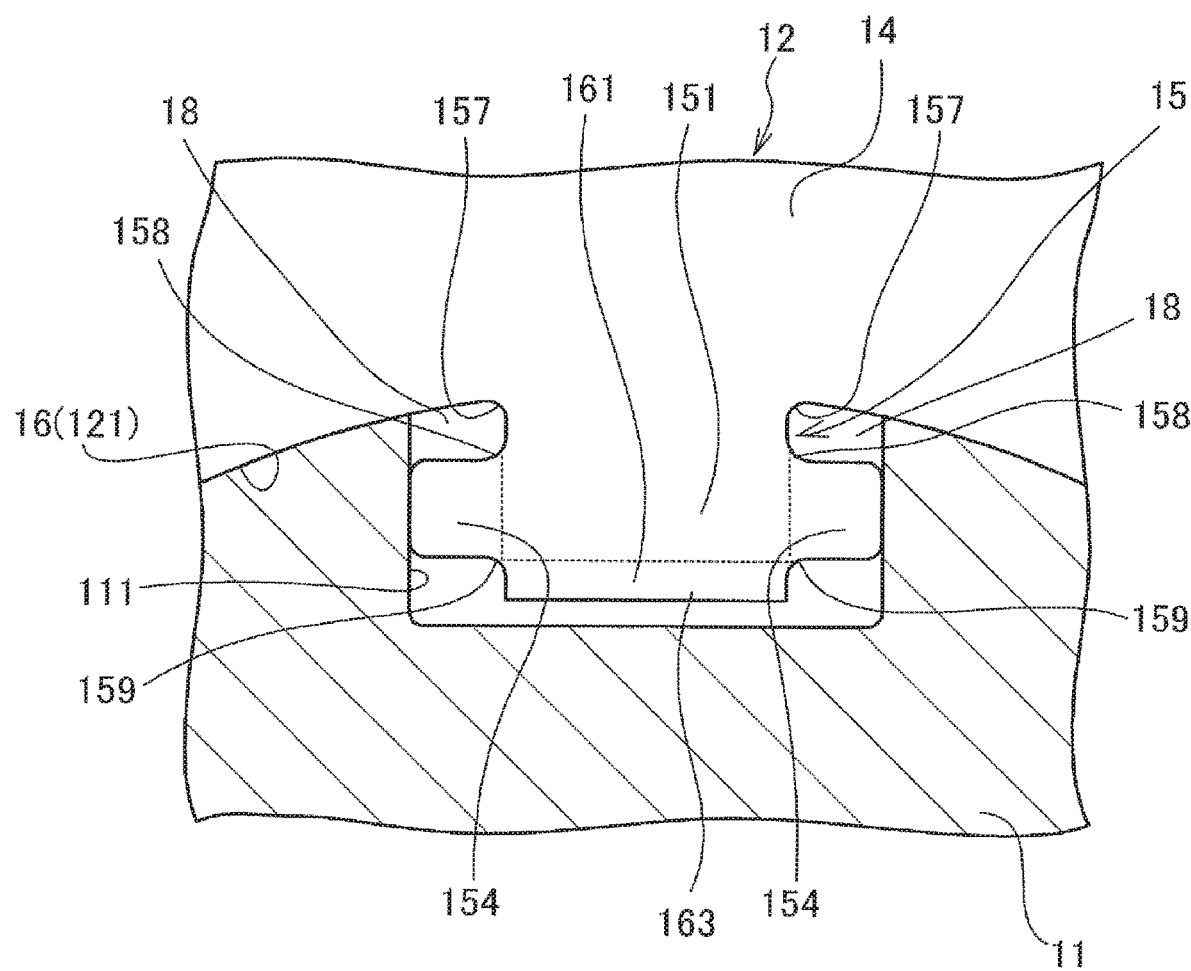
FIG. 9 is a partial enlarged view of an electromagnetic steel sheet according to a fourth embodiment.
Figure 10:
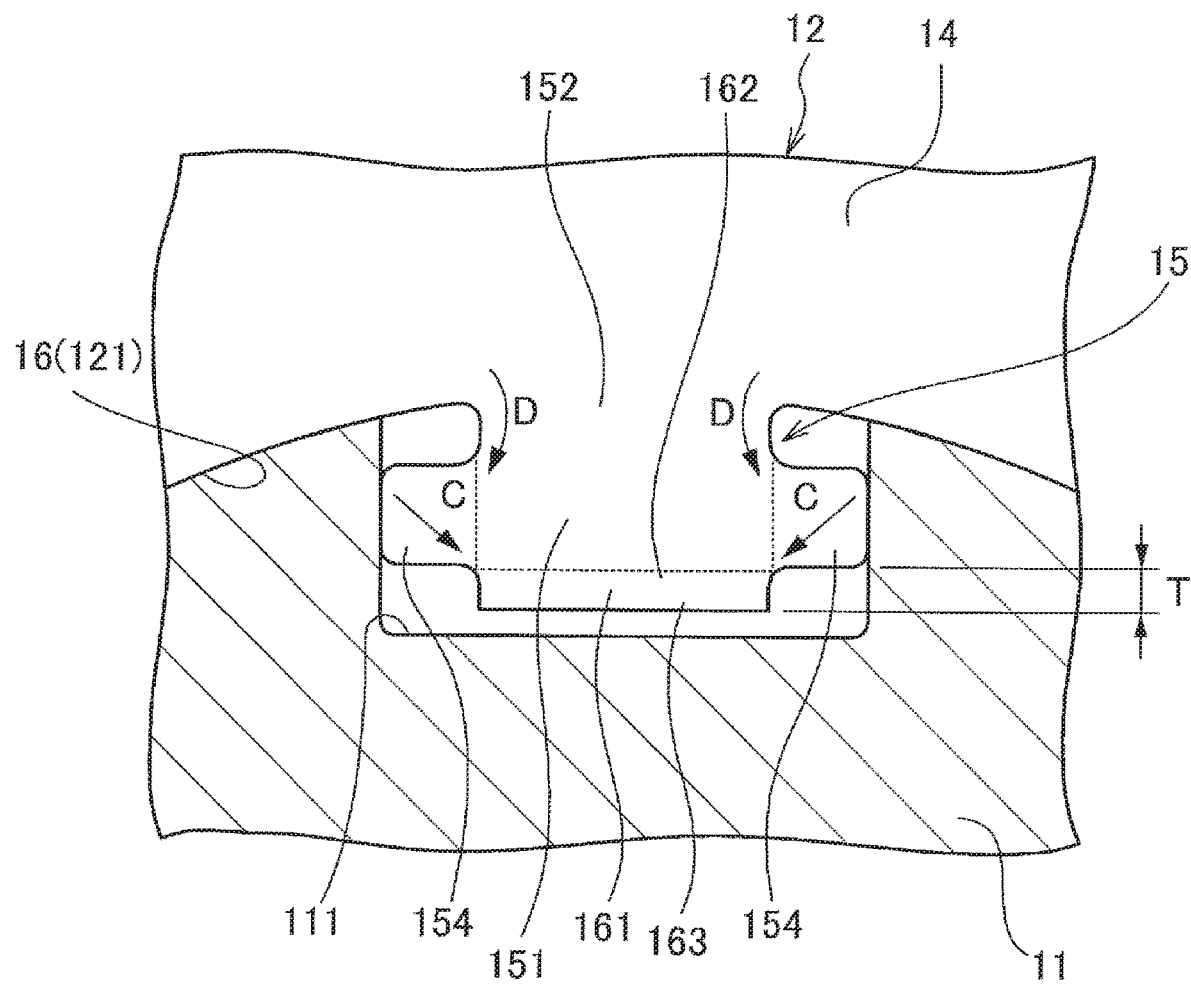
FIG. 10 is a partial enlarged view of the electromagnetic steel sheet according to the fourth embodiment.

With reference to FIGS. 9 and 10, the rotor 10 of the motor 1 according to a fourth embodiment will be described.

FIG. 9 is a partial enlarged view of the electromagnetic steel sheet 14 according to the fourth embodiment and is a view illustrating a part corresponding to the part A in FIG. 2 in an enlarged manner. The fourth embodiment is different from the rotor 10 of the motor 1 in the first embodiment in that the key 15 of the electromagnetic steel sheet 14 includes a protruding portion 161 in the distal end of the extension portion 151 such that the protruding portion 161 protrudes radially inwardly.

As illustrated in FIG. 9, the key 15 of the electromagnetic steel sheet 14 includes the protruding portion 161 in the distal end of the extension portion 151 such that the protruding portion 161 protrudes radially inwardly, in addition to the projection portions 154 extended outwardly (on the side faces) in the width direction of the extension portion 151 from the opposite side faces of the extension portion 151 in the width direction (the circumferential direction).

Similarly to the first embodiment, the shaft 11 is inserted into the shaft insert on hole 121 by clearance fit, and the key 15 is fitted by pressing into the keyway 111 such that two projection portions 154 of the key 15 abut on the opposite side faces of the keyway 111 of the shaft 11, respectively. In the press-fitting, the distal ends 156 of the projection portions 154 of the key 15 abut on the side faces of the keyway 111 in a state where the distal ends 156 deform in the axial direction.

As illustrated in FIG. 9, a magnitude of a width dimension of the protruding portion 161 is equal to a magnitude of a width dimension of the extension portion 151. A radial distal end 163 of the protruding portion 161 has a slight gap from the keyway 111 and does not abut on the keyway 111. The internal corner 157 at the position where the extension portion 151 is connected to the insertion hole 16, the internal corner 158 at the position where the extension portion 151 is connected to the projection portion 154, and an internal corner 159 at a position where the protruding portion 161 is connected to the projection portion 154 are formed to have a curved shape. The recessed portion 18 formed on the outer peripheral side of the projection portion 154 such that the recessed portion 18 is surrounded by the side face of the keyway 111 and the rotor core 12 is placed inwardly from the inside diameter line of the rotor core 12, and this is the same as the first embodiment.

Next will be described a tensile stress to be applied to the key 15, with reference to FIG. 10.

FIG. 10 is a view illustrating a compressive stress and a tensile stress applied to the key 15 when the key 15 of the electromagnetic steel sheet 14 is fitted by pressing into the keyway 111. When the key 15 is fitted by pressing into the keyway 111, a compressive stress to act on the projection portion 154 from the side face of the keyway 111 is diagonally applied in the inside-diameter direction (a direction indicated by an arrow C in FIG. 10) of the rotor 10. Due to the action of the compressive stress, the projection portion 154 deforms in the inside-diameter direction of the rotor, and a tensile stress in the inside-diameter direction a direction indicated by an arrow D in FIG. 10) of the rotor core 12 is applied to the vicinity of the root 152 of the extension portion 151 of the key 15.

The deformation of the projection portion 154 in the inside-diameter direction of the rotor due to the compressive stress to act on the projection portion 154 is restrained by the protruding portion 161 of the key 15. Hereby, it is also possible to reduce the tensile stress to be applied to the vicinity of the root 152 of the extension portion 151 of the key 15.

Further, the inventors of the present invention found, from results of study and analysis, that, as a length T from a root 162 to the distal end 163 in the protruding portion 161 is increased, a maximum value of the tensile stress to be applied to the vicinity of the root 152 of the key 15 is reduced rapidly until T reaches 0.5 mm, and when T exceeds 0.5 mm, the maximum value is reduced slowly. Accordingly, it is preferable to design a dimension of T to be equal to or more than 0.5 mm. However, T is not limited to this.

Note that, in the present embodiment, the magnitude of the width dimension of the protruding portion 161 is equal to the magnitude of the width dimension of the extension portion 151. However, the magnitude of the width dimension of the protruding portion 161 is not limited to this, as long as the magnitude of the width dimension of the protruding portion 161 is smaller than a width dimension of the keyway 111. Note that, in a case where the width dimension of the protruding portion 161 is smaller than the width dimension of the extension portion 151, an effect to restrain deformation of the projection portion 154 in the inside-diameter direction at the time of press-fitting of the key 15 is small, and therefore, it is preferable that the magnitude of the width dimension of the protruding portion 161 be equal to or larger than the width dimension of the extension portion 151.

The rotor for the dynamo-electric machine in the fourth embodiment can yield the following effects in addition to the effects obtained by the rotor for the dynamo-electric machine in the first embodiment.

The key 15 of the electromagnetic steel sheet includes the protruding portion 161 in the distal end of the extension portion 151 such that the protruding portion 161 protrudes radially inwardly, in addition to the projection portions 154 protruding outwardly in the width direction of the extension portion 151 from the opposite side faces of the extension portion 151 in the width direction. Hereby, the deformation of the projection portion 154 in the inside-diameter direction of the rotor due to the compressive stress to act on the projection portion 154 can be restrained, thereby making it possible to reduce the tensile stress to be applied to the vicinity of the root 152 of the key 15. This makes it possible to prevent the tensile stress to be applied to the root 152 of the key 15 from exceeding the yield stress of the electromagnetic steel sheet 14.

Further, the length T from the root 162 to the distal end 163 in the protruding portion 161 is designed to be equal to or more than 0.5 mm. This makes it possible to reduce the tensile stress to be applied to the vicinity of the root 152 of the key 15 and to prevent the tensile stress to be applied to the root 152 of the key 15 from exceeding the yield stress of the electromagnetic steel sheet 14.

Modification of Fourth Embodiment

Figure 11:
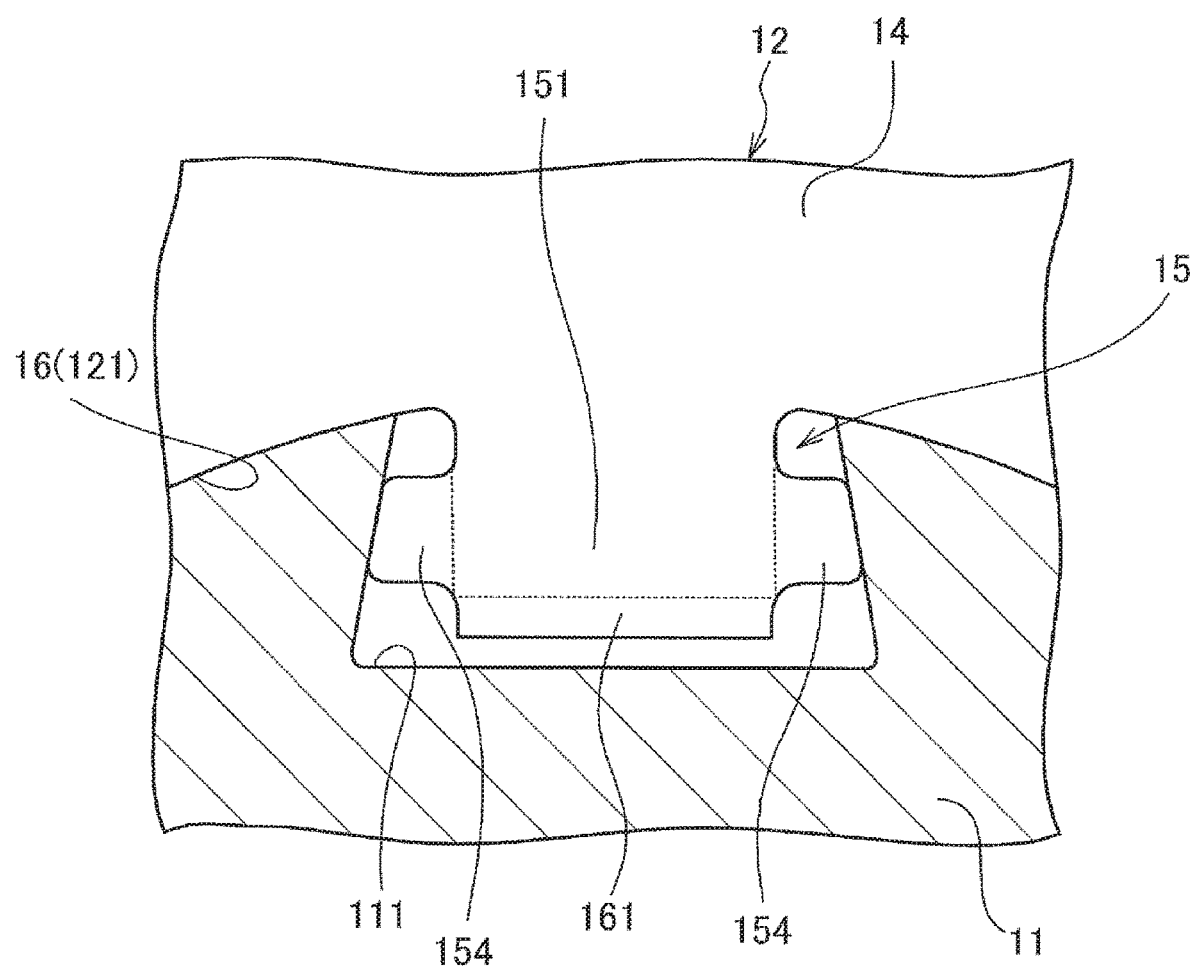
FIG. 11 is a partial enlarged view of an electromagnetic steel sheet according to a modification of the fourth embodiment.

With reference to FIG. 11, the rotor 10 of the motor 1 according to a modification of the fourth embodiment will be described. Note that this modification is described as a modification of the fourth embodiment, but the modification can be also combined with any of the embodiments appropriately.

FIG. 11 is a partial enlarged view of the electromagnetic steel sheet 14 according to the modification of the fourth embodiment and is a view illustrating a part corresponding to the part A in FIG. 2 in an enlarged manner. As illustrated in FIG. 11, in the present modification, the side faces of the keyway 111 of the shaft 11 are formed in a tapered shape in which a width between the side faces becomes narrow toward an outer-periphery direction of the shaft 11.

The electromagnetic steel sheet 14 forming the rotor core 12 has such a concern that the key 15 might deviate from the shaft 11 toward the outer-periphery direction of the shaft 11 due to a centrifugal force caused by rotation of the rotor 10 or an impact load caused by a collision or the like of the vehicle. In the present modification, the side faces of the keyway 111 of the shaft 11 are formed in a tapered shape in which the width between the side faces becomes narrow toward the outer-periphery direction of the shaft 11. This makes it possible to prevent the key 15 from deviating from the shaft 11 toward the outer-periphery direction of the shaft 11 due to the centrifugal force or the impact load.

The embodiments of the present invention have been described above, but the embodiments just show some applications of the present invention and are not intended to limit the technical scope of the present invention to the concrete configurations of the embodiments.

In any of the above embodiments, it is preferable that a plurality of keys 15 in the electromagnetic steel sheet 14 be provided at regular intervals in the circumferential direction of the electromagnetic steel sheet 14, but the arrangement of the keys 15 is not limited to this, and the keys 15 may not be placed at regular intervals.

Further, in any of the above embodiments, the magnets 6 are placed at regular intervals on the end face of the rotor core 12 on the outer peripheral side, but the arrangement of the magnets 6 is not limited to this.

Further, in any of the above embodiments, it is preferable that the radial distal end 153 of the extension portion 151 or the radial distal end 163 of the protruding portion 161 do not abut on the keyway 111. However, the present invention is not necessarily limited to this, and the radial distal end 153 or the radial distal end 163 may abut on the keyway 111.

Further, in any of the above embodiments except the second embodiment, it is preferable that the recessed portion 18 formed on the outer peripheral side of the projection portion 154 such that the recessed portion 18 is surrounded by the side face of the keyway 111 and the rotor core 12 be placed inwardly from the inside diameter line of the rotor core 12. However, the present invention is not necessarily limited to this, and the recessed portion 18 may project outwardly from the inside diameter line of the rotor core 12.

Further, in any of the above embodiments, it is preferable that the value of L/W be equal to or more than 0.5 when L indicates the length from the root 155 to the distal end 156 in the projection portion 154 of the key 15, and W indicates the width dimension of the projection portion 154. However, the present invention is not limited to this.

Further, in each of the above embodiments, it is preferable that the internal corner 157 at the position where the extension portion 151 is connected to the insertion hole 16, the internal corner 158 at the position where the extension portion 151 is connected to the projection portion 154, and the internal corner 159 at the position where the protruding portion 161 is connected to the projection portion 154 be formed to have a curved shape. However, the present invention is not limited to this, and the internal corner 157, the internal corner 158, and the internal corner 159 may be formed to have a square shape, for example.

Each of the embodiments described above has been described as an independent embodiment, but the embodiments may be combined appropriately.

The invention claimed is:

1. A rotor for a dynamo-electric machine, the rotor comprising:
    a shaft; and
    a rotor core constituted by laminating a plurality of electromagnetic steel sheets, the rotor core being configured such that the shaft is attached to an inner periphery of the rotor core, wherein:
    each of the electromagnetic steel sheets constituting the rotor core includes an insertion hole into which the shaft is inserted, and a key protruding radially inwardly from the insertion hole;
    the shaft includes a keyway formed along an axial direction;
    the shaft is attached by clearance fit to the insertion holes of the electromagnetic steel sheets;
    the key includes an extension portion protruding radially inwardly from the insertion hole, and projection portions extended outwardly in a width direction of the extension portion from opposite side faces of the extension portion in the width direction;
    the key is fitted by pressing into the keyway such that the projection portions abut on opposite side faces of the keyway, respectively, and
    the distal end of the extension portion is provided with a protruding portion protruding radially inwardly.

2. The rotor for the dynamo-electric machine, according to claim 1, wherein
a recessed portion is formed on an outer peripheral side of the projection portion such that the recessed portion is located inwardly from an inside diameter line of the rotor core and surrounded by the side face of the keyway and the rotor core.

3. The rotor for the dynamo-electric machine, according to claim 1, wherein
L/W is equal to or more than 0.5 when L indicates a length from a root to a distal end in the projection portion and W indicates a width dimension of the projection portion.

4. The rotor for the dynamo-electric machine, according to claim 1, wherein
a magnitude of a width dimension of the protruding portion is equal to or larger than a width dimension of the extension portion but smaller than a width of the keyway.

5. The rotor for the dynamo-electric machine, according to claim 1, wherein
a length from a root to a distal end in the protruding portion is equal to or more than 0.5 mm.

6. The rotor for the dynamo-electric machine, according to claim 1 wherein
an internal corner at a position where the extension portion is connected to the projection portion and an internal corner at a position where the extension portion is connected to the insertion hole are formed to have a curved shape.

7. The rotor for the dynamo-electric machine, according to claim 1, wherein
an internal corner at a position where the extension portion is connected to the projection portion, an internal corner at a position where the extension portion is connected to the insertion hole, and an internal corner at a position where the protruding portion is connected to the projection portion are formed to have a curved shape.

8. The rotor for the dynamo-electric machine, according to claim 1, wherein
a plurality of keyways and a plurality of keys are formed at regular intervals in a circumferential direction on the shaft and on the electromagnetic steel sheets, respectively.

9. The rotor for the dynamo-electric machine, according to claim 1, wherein
the keyway is formed in a tapered shape in which a width between side faces of the keyway becomes narrow toward an outer-periphery direction of the shaft.

10. A dynamo-electric machine comprising:
the rotor according to claim 1; and
a stator provided around the rotor.

* * * * *